(12) United States Patent
Kadono

(10) Patent No.: US 6,564,004 B1
(45) Date of Patent: May 13, 2003

(54) REPRODUCING APPARATUS AND REPRODUCING METHOD

(75) Inventor: Toru Kadono, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/277,446

(22) Filed: Mar. 26, 1999

(30) Foreign Application Priority Data

Apr. 2, 1998 (JP) .............................................. 10-089780

(51) Int. Cl.$^7$ .............................. H04N 5/91; H04N 7/64; H04N 5/85
(52) U.S. Cl. ........................... 386/82; 386/113; 386/126
(58) Field of Search .............................. 386/82, 80, 77, 386/70, 105, 106, 124, 125, 126, 129, 6, 15, 45, 107, 117, 38, 13, 85, 87, 21, 113; H04N 5/91, 7/64, 5/85

(56) References Cited

U.S. PATENT DOCUMENTS 4,872,073 A * 10/1989 Fincher et al.
5,432,769 A *  7/1995 Honjo \* cited by examiner

*Primary Examiner*—Robert Chevalier
(74) *Attorney, Agent, or Firm*—Oblon, Spivak, McClelland, Maier & Neustadt, P.C.

(57) ABSTRACT

The invention provides a reproducing apparatus and a reproducing method, in which moving picture data read out from a recording medium is once stored in a buffer memory, when the stored data is less than a predetermined amount, by reducing an operating speed of an image compression decoder, a transfer rate to read out the data from the buffer memory is reduced, thereby enabling a moving picture to be reproduced slowly and preventing an interruption of images.

26 Claims, 6 Drawing Sheets

Fig. 4

| | MD-DATA2 | MD-DATA1 |
|---|---|---|
| TRACK PITCH | 0.95 μm | 1.6 μm |
| PIT LENGTH | 0.39 μm/bit | 0.59 μm/bit |
| λ·NA | 650nm·0.52 | 780nm·1.45 |
| RECORDING SYSTEM | LAND RECORDING | GROOVE RECORDING |
| ADDRESSING SYSTEM | INTERLACE ADDRESSING (ONE-SIDE WOBBLE OF DOUBLE SPIRAL) | BOTH-SIDE WOBBLE OF SINGLE SPIRAL |
| MODULATING SYSTEM | PLL(1.7) | EFM |
| ERROR CORRECTING SYSTEM | RS-PC | ACIRC |
| INTERLEAVE | BLOCK COMPLETED | CONVOLUTION |
| REDUNDANCY | 19.7% | 46.3% |
| LINEAR VELOCITY | 2.0m/s | 1.2m/s |
| DATA RATE | 589kB/s | 133kB/s |
| RECORDING CAPACITY | 850MB | 140MB |

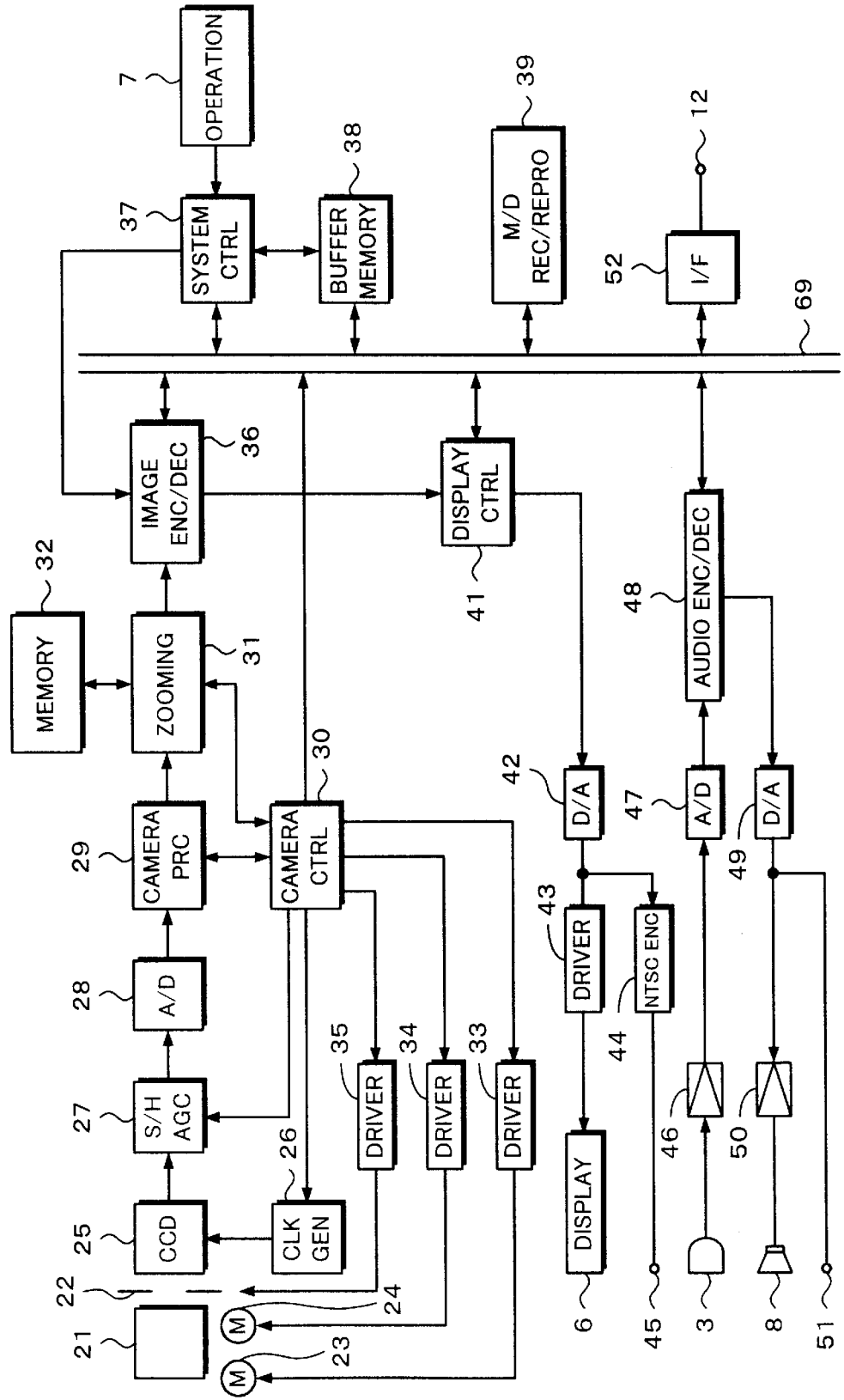

REPRODUCING APPARATUS AND REPRODUCING METHOD

BACKGROUND OF THE INVENTION

1. Field of the Invention

The present invention relates to a reproducing apparatus and a reproducing method, in which moving picture data read out from a recording medium is once accumulated into a buffer memory and when an amount of accumulated data is less than a predetermined amount, a processing speed of an image compression decoder is reduced, thereby allowing images to be slowly reproduced and preventing interruption of the images.

2. Description of the Related Art

In recent years, a digital camera for digitizing still pictures photographed by a video camera and recording it into a recording medium such as semiconductor memory, magnetic disc, optical disc, or the like has been being rapidly spread. When the digital camera is used, the photographed pictures can be reproduced on the spot and the digital still pictures can be easily transmitted to a personal computer and can be easily edited and proceeded.

Further, in the digital camera as described above, a digital camera which can record not only the still pictures but also moving pictures has already been developed. In the digital camera which can record the moving picture, a video signal of a moving picture taken by a video camera is digitized and is compressed by the MPEG (Moving Picture Experts Group) system or the MPEG2 system. The compressed digital video signal is recorded onto a recording medium such as semiconductor memory, magnetic disc, optical disc, or the like.

In the digital video camera which can record the moving picture as mentioned above, since an amount of data to be recorded becomes enormous, a recording medium having a large capacity is demanded. Since the digital camera is often carried to the outside and is used, it is desirable that the digital camera is small and is easy to handle.

The applicant of the present invention proposes to use an MD (Mini Disc, trademark) which improves a recording capacity and a data rate by improving physical characteristics and signal processes.

As is well-known, the MD is an optical disc or a magnetooptic disc having the diameter of 64 mm enclosed in a cartridge. According to the conventional MD format called MD-DATA1, a recording capacity is equal to 140 MB when data is recorded and a data rate is equal to 133 kB/sec. It cannot be said that the conventional MD is sufficient for recording the moving picture data.

A new MD format is called MD-DATA2, a recording capacity is equal to 650 MB, and a data rate is equal to 589 kB/sec. As mentioned above, in the new MD format, as compared with the conventional format, the recording capacity is larger and the data rate is higher by more than four times and it is sufficient for recording even moving picture data. Since the MD is either an optical. disc or magnetooptic disc, an accessing speed is high. The MD has been already widely spread as a music recording disc and is very reliable. The MD is, therefore, suitable to record the moving picture data in the digital video camera.

An MD recording and reproducing apparatus has a buffer memory called a shock-proof memory. Data reproduced. from a disc is once stored in the buffer memory and is outputted to the outside. By the buffer memory, even when a disturbance to a certain extent occurs, the reproduction is not interrupted. Even in a digital video camera using the MD as a recording medium, reproduction data from a disc is once stored into the buffer memory and is sent to a decoder for image decompression.

That is, moving picture data has been compressed and recorded in the disc. At the time of reproduction, reproduction data from the disc is transmitted to the decoder for image decompression and is decompressed. By a difference between a transfer rate of the data which is reproduced from the disc and a transfer rate of the data which is sent to the decoder for image decompression, a certain amount of data is always stored in the buffer memory. As mentioned above, since a predetermined amount of data is always stored in the buffer memory, even if a disturbance to a certain extent occurs, the moving pictures can be reproduced continuously.

Even if the buffer memory as mentioned above is provided, when a disturbance is large and an abnormal rotation of the disc, an out-of focusing state, an out-of tracking state, or the like occurs, the data in the buffer memory is exhausted. When the data in the buffer memory is exhausted as mentioned above, the moving picture cannot be reproduced and the reproduction is temporarily interrupted.

OBJECT AND SUMMARY OF THE INVENTION

It is, therefore, an object of the invention to provide a reproducing apparatus which prevents the reproduction from being temporarily interrupted even when a disturbance is large.

In view of the problems, it is an object of the invention to provide a reproducing apparatus comprising: data reading means for reading out moving picture data from a recording medium in which the moving picture data has been recorded; data storage means for storing the moving picture data read out by the data reading means at a predetermined transfer rate; data processing means for processing the moving picture data read out from the data storage means at a variable processing speed; and control means for monitoring an amount of data stored in the data storage means and, when the data amount is less than a predetermined value, decreasing the processing speed of the data processing means.

The above reproducing apparatus further has image display means for displaying the moving picture data from the data processing means, wherein when the data amount in the data storage means is less than the predetermined value, the moving picture data in the image displaying means is displayed at a low speed.

It is another object of the invention to provide a reproducing method comprising the steps of: reading out moving picture data from a recording medium in which the moving picture data has been recorded; storing the read-out moving picture data into a memory at a predetermined transfer rate; monitoring an amount of data in the memory; and processing the data read out from the memory at a low speed when it is determined in the monitoring step that the data amount is less than a predetermined value.

The above reproducing method further comprises the step of displaying the moving picture data processed in the data processing step.

The above and other objects and features of the present invention will become apparent from the following detailed description and the appended claims with reference to the accompanying drawings.

BRIEF DESCRIPTION OF THE DRAWINGS

FIG. 4 is a comparison diagram of specifications of an MD-DATA1 format and the MD-DATA2 format;

FIG. 5 is a block diagram showing a construction of a camera unit in the video camera according to the embodiment of the invention;

DETAILED DESCRIPTION OF THE PREFERRED EMBODIMENTS

An embodiment of the invention will now be described hereinbelow with reference to the drawings.

Figure 1C:
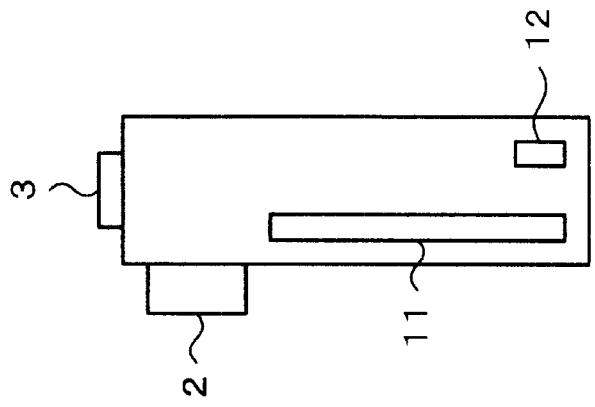
FIG. 1C is a diagram of the video camera according to the embodiment of the invention when it is seen from the side.
Figure 1B:
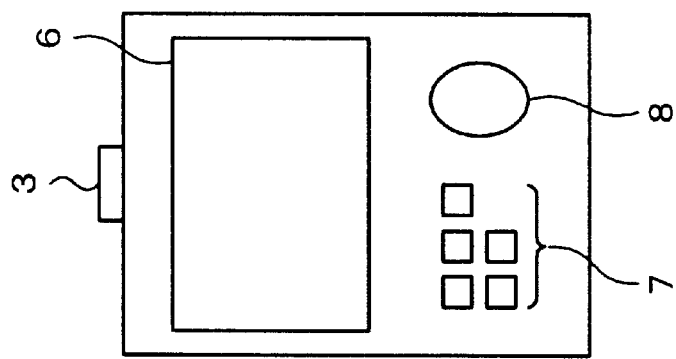
FIG. 1B is a diagram of the video camera according to the embodiment of the invention when it is seen from the rear side.
Figure 1A:
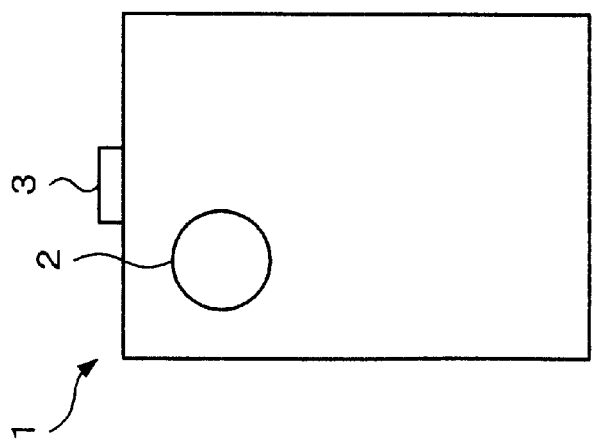
FIG. 1A is a diagram of a video camera according to an embodiment of the invention when it is seen from the front side.

FIG. 1A is a front view of an external appearance construction of a video camera as an embodiment of the invention. FIG. 1B is a rear view showing an external appearance construction of the video camera according to the embodiment of the invention. FIG. 1C is a side view showing an external appearance construction of the video camera according to the embodiment of the invention. In FIG. 1A, a camera lens 2 having a lens group, an iris, and the like for photographing is provided on the front side of a video camera main body 1. The lens group of the camera lens 2 includes a zoom lens and a focusing lens. In the top portion of the video camera main body 1, a microphone 3 for collecting external sound at the time of photographing is provided.

On the rear side of the video camera main body 1, a display unit 6, an operation unit 7, and a speaker 8 are provided. As a display unit 6, for example, a liquid crystal display is used. The display unit 6 functions as a finder to monitor a photographed picture plane upon photographing and functions as a monitor to display a reproduction image upon reproduction. In the picture plane of the display unit 6, characters, symbol marks, and the like for notifying the user of a message in accordance with the operation of equipment are superimposed and displayed.

A group of keys for the user to perform various operations are arranged in the operation unit 7. As keys arranged in the operation unit 7, basic keys to operate the video camera, for example, a recording start key and a recording stop key of a photographed image are arranged. Various keys such as reproduction key, search key, fast-forward key, fast-reverse key, and the like for the reproducing operation to reproduce the recorded contents are also arranged in the operation unit 7.

In FIG. 1, the speaker 8 is provided on the rear side of the video camera main body 1. The speaker 8 is used to reproduce and output the sound recorded by an internal recording and reproducing apparatus and also to output a required message sound of, for example, a beep sound or the like.

On the side face of the video camera main body 1, a disc slot 11 and an I/F (interface) terminal 12 are provided. A disc which is used as a recording medium is inserted or ejected to/from the disc slot 11. An MD of the MD-DATA2 format is used as a disc. The I/F terminal 12 is an input/output terminal of an interface, for example, for performing a data transmission to/from external data equipment. For example, an IEEE (Institute of Electrical and Electronic Engineers) 1394 is used as an I/F terminal 12.

In the digital video camera to which the invention is applied as mentioned above, the MD of the MD-DATA2 format is used as a recording medium. The MD-DATA2 format intends to improve a recording capacity and a data rate by improving physical characteristics and the signal processes.

That is, as an MD data format, in addition to the conventional MD-DATA1, the format called MD-DATA2 has been developed. MD-DATA1 is a format to record data on the basis of the MD system, a recording capacity is equal to 140 MB, and a data rate is equal to 133 kB/sec. On the other hand, according to MD-DATA2, the recording capacity and the data rate are improved by improving the physical characteristics and signal processes, a recording capacity is equal to 650 MB, and a data rate is equal to 589 kB/sec. MD-DATA2 has a specification better than that of MD-DATA1 more than four times.

Figure 2:
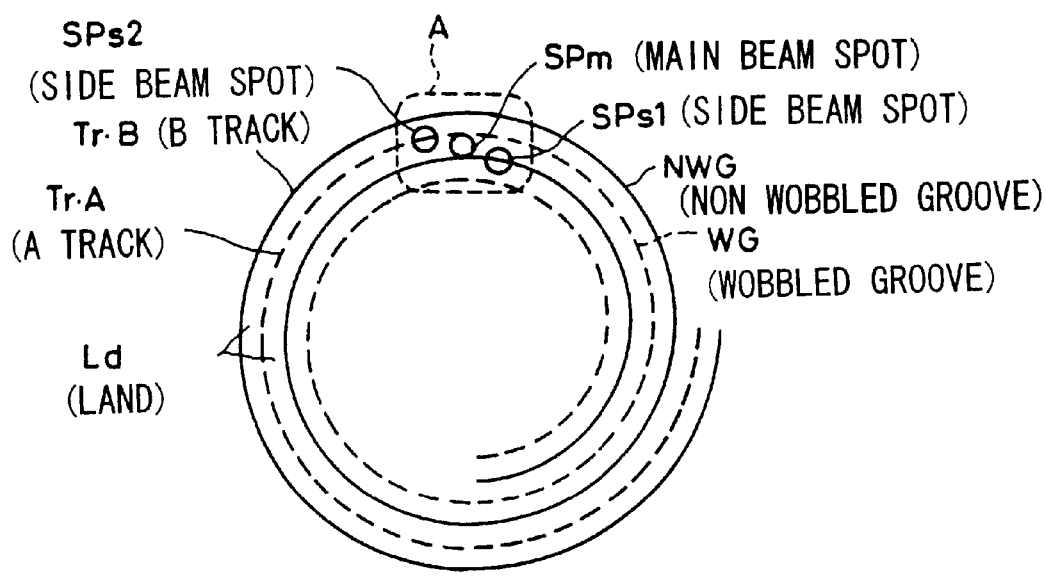
FIG. 2 is a schematic diagram for use in explanation of a disc of an MD-DATA2 format.
Figure 3:
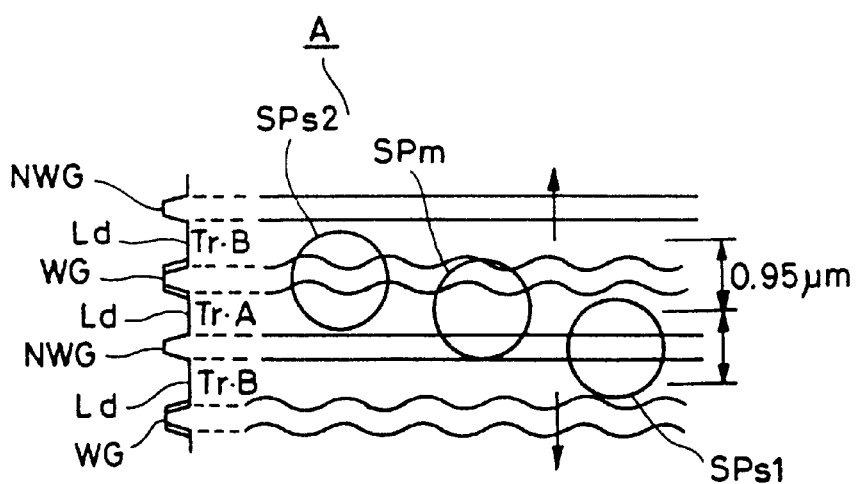
FIG. 3 is a schematic diagram for use in explanation of each track of the disc of the MD-DATA2 format.

FIGS. 2 and 3 show a construction of tracks of the MD-DATA2 disc. FIG. 3 enlargedly shows a part surrounded by a broken line A in FIG. 2.

As shown in FIGS. 2 and 3, two kinds of grooves of a wobbled groove WG with a wobble and a non-wobbled groove NWG without a wobble are preliminarily formed on the disc surface. A land Ld is formed between the wobbled groove WG and the non-wobbled groove NWG. In the MD-DATA2 format, the land Ld is used as a track. There are two kinds of grooves of the wobbled groove WG and the non-wobbled groove NWG and there are also two kinds of tracks of tracks Tr·A and Tr·B. The two kinds of tracks Tr·A and Tr·B are formed independently on double spirals.

As shown in FIG. 3, in the track Tr·A, the wobbled groove WG is positioned on the outer rim side of the disc and the non-wobbled groove NWG is positioned on the inner rim side. On the contrary, in the track Tr·B, the wobbled groove WG is positioned on the inner rim side of the disc and the non-wobbled groove NWG is positioned on the outer rim side of the disc. A track pitch is a distance between the centers of the neighboring tracks Tr·A and Tr·B and, as shown in FIG. 3, is set to 0.95 µm.

Physical addresses on the disc are encoded by an FM (Frequency Modulation) and a biphase modulation and are recorded in the wobbles formed in the groove of the wobbled groove WG. Therefore, upon recording and reproduction, by demodulating the reproduction information which is obtained from the wobbling given to the wobbled groove WG, the physical addresses on the disc can be extracted.

The address information of the wobbled groove WG is validated commonly to the tracks Tr·A and Tr·B. That is, the address information by the wobbling given to the wobbled groove WG is commonly used for both of the track Tr·A locating on the inner rim side so as to sandwich the wobbled groove WG and the track Tr·B locating on the outer rim side.

The above addressing method is called an interlace addressing method. By using the interlace addressing method, for example, a track pitch can be reduced while suppressing the crosstalks between the adjacent wobbles. A method of recording addresses by forming wobbles onto the groove is called an ADIP (Address In Pregroove) method.

Which one of the tracks Tr·A and Tr·B which commonly use the same address information is being traced can be discriminated as follows.

For example, when the 3-beam system is used, it is considered such that in a state where a main beam is tracing a land Ld as a track, two remaining side beams are tracing the grooves locating on both sides of the track that is being traced by the main beam.

FIG. 3 shows a state where a main beam spot SPm is tracing the track Tr·A as a specific example. In this case, in two side beam spots SPs1 and SPs2, the side beam spot SPs1 on the inner rim side traces the non-wobbled groove NWG and the side beam spot SPs2 on the outer rim side traces the wobbled groove WG.

On the other hand, although not shown, in a state where a main beam spot SPm is tracing the tracks Tr·B, the side beam spot SPs1 traces the wobbled groove WG and the side beam spot SPs2 traces the non-wobbled groove NWG.

As mentioned above, in the case where the main beam spot SPm traces the tracks Tr·A and the case where the main beam spot SPm traces the tracks Tr·B, the grooves to be traced by the side beam spots SPs1 and SPs2 are inevitably exchanged for the wobbled groove WG and the non-wobbled groove NWG.

As for a detection signal obtained by a photodetector due to the reflection of the side beam spots SPs1 and SPs2, a different waveform is obtained in dependence on which one of the wobbled groove WG and the non-wobbled groove NWG is being traced. Therefore, for example, by discriminating by which one of the side beam spots SPs1 and SPs2 the wobbled groove WG or the non-wobbled groove NWG is being traced at present on the basis of the detection signal, which one of the tracks Tr·A and Tr·B is being traced by the main beam can be discriminated.

FIG. 4 is a table showing a comparison between the main specification of the MD-DATA2 format having such a track structure and that of the MD-DATA1 format.

In the MD-DATA1 format, a track pitch is set to 1.6 μm and a pit length is set to 0.59 μm/bit. A laser wavelength λ is set to 780 nm and a numerical aperture NA of an optical head is set to 0.45. A groove recording system is used as a recording system. A wobbled groove in which after a groove as a track by a single spiral was formed, wobbles are formed as address information to both sides of this groove is used as an addressing system. An EFM (Eight to Fourteen Modulation) system is used as a modulating system of the recording data. An ACIRC (Advanced Cross Interleave Reed-Solomon Code) is used as an error correcting system. A convolution type is used for a data interleave. Therefore, a redundancy of data is equal to 46.3%. In the MD-DATA1 format, a CLV (Constant Linear Velocity) is used as a disc driving system. A linear velocity of the CLV is set to 1.2 m/sec. A standard data rate upon recording and reproduction is set to 133 kB/sec and a recording capacity is set to 140 MB.

As compared with the above specifications, in the MD-DATA2 format, a track pitch is equal to 0.95 μm and a pit length is set to 0.39 μm/bit and these values are shorter than those in the MD-DATA1 format. A laser wavelength λ is set to 650 nm and a numerical aperture NA of an optical head is set to 0.52. A beam spot diameter at a focal position is converged and a band as an optical system is widened.

As described in FIGS. 2 and 3, a land recording system is used as a recording system of the MD-DATA2 format and an interlace addressing system is used as an address system. An RLL (Run Length Limited) (1,7) system adapted to the high density recording is used as a modulating system of the recording data. An RS-PC (Reed-Solomon Product Code) system is used as an error correcting system. A block completion type is used as a deinterleave system. By using the above systems, consequently, a redundancy of the data can be suppressed to 19.7%. Even in the MD-DATA2 format, although the CLV is used as a disc driving system, a linear velocity is set to 2.0 m/sec and a standard data rate upon recording and reproduction is set to 589 kB/sec. A recording capacity of 650 MB can be obtained. A high density recording of four or more times as high as that in the MD-DATA1 format is realized.

For instance, if the MD-DATA2 format is used, in case of compression encoding a moving picture by MPEG2 and recording it, moving pictures corresponding to 15 to 17 minutes can be recorded although it depends on the bit rate of the encoding data. Now, assuming that only audio signal data is recorded, when a compressing process by the ATRAC (Adaptive TRansform Acoustic Coding) 2 is performed to audio signal data, the audio signal corresponding to about 10 hours can be recorded.

An internal construction of a video camera constructed as mentioned above will now be described. FIG. 5 shows the internal construction of the video camera as a specific example of the invention.

In FIG. 5, reference numeral 21 denotes a lens block. The lens block 21 corresponds to the camera lens 2 in FIGS. 1A and 1C. Upon recording, the lens block 21 is directed toward an object image (image to be photographed).

The lens block 21 converges the object image light onto an image pickup surface of a CCD (Charge Coupled Device) image pickup device 25. A zoom lens and a focusing lens are included in the lens block 21. The zoom lens and focusing lens can be moved by a zoom motor 23 and a focusing motor 24.

The object image light is converged by the lens block 21, a light amount is converged by an iris 22, and the converged light is formed as an image onto a photosensing surface of the CCD image pickup device 25. An opening degree of the iris 22 is controlled by a camera controller 30.

A transfer clock is transmitted from a clock generating circuit 26 to the CCD image pickup device 25. The light image converged on the photosensing surface is photoelectrically converted by the CCD image pickup device 25.

An output of the CCD image pickup device 25 is supplied to a sampling and holding and AGC (Automatic Gain Control) circuit (hereinafter, simply referred to as an S/H & AGC circuit) 27. An output of each pixel of the CCD image pickup device 25 is sampled and held and is amplified to a predetermined level by the S/H & AGC circuit 27. A gain of the S/H & AGC circuit 27 is controlled by the camera controller 30.

An output of the S/H & AGC circuit 27 is supplied to an A/D (analog to digital) converter 28. The image pickup signal from the S/H & AGC circuit 27 is converted to the digital signal by the A/D converter 28. An output of the A/D converter 28 is supplied to a camera signal processing circuit 29.

The camera signal processing circuit 29 performs preprocesses such as gamma correction, aperture correction, and the like and forms a component video signal comprising a luminance signal Y and color difference signals CR and CB from the image pickup signal that is outputted from the A/D converter 28. The component video signal is supplied to an electronic zooming circuit 31.

Optical detection signals such as focusing detection signal, exposure detection signal, white balance detection signal, and the like are formed by the camera signal processing circuit 29. These optical detection signals are supplied to the camera controller 30. The focusing detection signal is obtained by, for example, extracting the level of the high band components of the luminance signal Y. The exposure detection signal is derived by, for instance, detecting the level of the luminance signal Y.

A zoom motor driving signal, a focusing motor driving signal, an iris driving signal, and an AGC level control signal are generated from the camera controller 30. The zoom motor driving signal is generated on the basis of the operations of a zoom-in key and a zoom-out key included in the operation unit 7. The focusing motor driving signal is generated on the basis of the focusing detection signal from the camera signal processing circuit 29. The iris driving signal and the AGC level control signal are generated on the basis of the exposure detection signal from the camera signal processing circuit 29.

The zoom motor driving signal from the camera controller 30 is supplied to the zoom motor 23 via a driver 33, so that a zoom control is optically performed. The focusing motor driving signal from the camera controller 30 is supplied to the focusing motor 24 via a driver 34, so that a focusing control is performed. The iris driving signal is supplied to the iris 22 via a driver 35. The AGC level control signal is supplied to the S/H & AGC circuit 27.

As mentioned above, the component video signal comprising the luminance signal Y and the color difference signals $C_R$ and $C_B$ based on an image pickup picture plane is outputted from the camera signal processing circuit 29. An output of the camera signal processing circuit 29 is supplied to the electronic zooming circuit 31.

The electronic zooming circuit 31 has an image memory 32. The electronic zooming circuit 31 enlargedly interpolates the image pickup picture plane, thereby forming a zoomed picture plane. When the zoomed picture plane exceeds a zoom range by the zoom lens, the operation of the electronic zoom by the electronic zooming circuit 31 is performed.

An output of the electronic zooming circuit 31 is supplied to an image compression encoder and decoder 36. Upon recording, the image compression encoder and decoder 36 performs a process to compress the component video signal which comprises the luminance signal Y and the color difference signals $C_R$ and $C_B$ and which is supplied through the electronic zooming circuit 31.

For example, the MPEG (Moving Picture Experts Group) 2 system is used as a compression system of a moving picture. The MPEG2 system intends to compress a moving image by an interframe predictive coding and a DCT (Discrete Cosine Transform). A still image is compressed by a JPEG (Joint Photographic Coding Experts Group) system. The JPEG system compresses a still image by the DCT.

The compression system is not limited to the above systems. Any other system except for the MPEG2 system can be also used as a compression system of a moving picture. Any other system except for the JPEG system can be also used as a compression system of a still picture.

Upon recording, the video data compressed by the image compression encoder and decoder 36 is once stored into a buffer memory 38 by the control of a system controller 37.

Upon recording, a picture plane photographed by the CCD image pickup device 25 needs to be displayed as a finder picture plane. For this purpose, the component video signal transmitted through the electronic zooming circuit 31 is extracted through the image compression encoder and decoder 36 and supplied to a display control circuit 41. The display control circuit 41 superimposes characters of a display for various adjustments and an alarm display onto the picture plane. The display control circuit 41 has a memory (not shown) and can form thumbnail pictures of a plurality of scenes.

An output of the display control circuit 41 is supplied to a D/A converter 42. The digital component video signal is converted into the analog signal by the D/A converter 42. An output of the D/A converter 42 is supplied to the display unit 6 through a driving circuit 43.

An output of the D/A converter 42 is supplied to an NTSC (National Television System Committee) encoder 44. The component video signal comprising a luminance signal Y and color difference signals $C_R$ and $C_B$ is converted into a composite video signal of the NTSC system by the NTSC encoder 44. The composite video signal is outputted from an external output terminal 45.

Upon recording, an external sound is collected by the microphone 3. An audio signal that is generated from the microphone 3 is supplied to an A/D converter 47 through an amplifier 46.

The audio signal is converted into a digital signal by the A/D converter 47. An output of the A/D converter 47 is supplied to an audio signal compression encoder and decoder 48. The audio signal is compressed by the audio signal compression encoder and decoder 48.

For example, an ATRAC (Adaptive TRansform Acoustic Coding) 2 is used as a compression method of the audio signal. According to the ATRAC2, the audio signal is band-divided by a band dividing filter and is subsequently spectrum signal transformed by an MDCT (Modified Discrete Cosine Transform), thereby compressing the audio signal.

The compression method of the audio signal is not limited to the ATRAC2. For example, an MPEG audio system can be also used as a compression method of the audio signal.

The audio signal compressed by the audio signal compression encoder and decoder 48 is once accumulated into the buffer memory 38 by a control of the system controller 37. Video data and audio data are developed into a predetermined format in the buffer memory 38 and are subjected to processes of a scrambling and an error correction coding. An output of the buffer memory 38 is transmitted to an MD recording and reproducing unit 39.

Upon reproduction, the video data and audio data are read out from the MD recording and reproducing unit 39. The read-out video data and audio data are once accumulated into the buffer memory 38 via a data bus 69. A memory capacity of the data accumulated in the buffer memory 38 is monitored by the system controller 37. The video data and audio data are separated in the buffer memory 38 and a descrambling and an error correcting process are performed. The video data read out from the buffer memory 38 is sent to the image compression encoder and decoder 36 and the audio data is transmitted to the audio signal compression encoder and decoder 48.

A decompressing process of the MPEG2 is performed by the image compression encoder and decoder 36. Thus, the video signal compressed by the MPEG2 system is decoded to the component video signal comprising the luminance signal Y and the color difference signals $C_R$ and $C_B$.

An output of the image compression encoder and decoder 36 is supplied to the D/A (digital to analog) converter 42 via the display control circuit 41. The display control circuit 41 has a display function of a thumbnail picture and can display the thumbnail pictures of a plurality of scenes. A position meter showing a free capacity of the disc or the current reproducing position can be formed by using the thumbnail images.

The digital component video signal is converted into the analog signal by the D/A converter 42. An output of the D/A converter 42 is supplied to the display unit 6 via the driving circuit 43. A reproduction picture plane is displayed by the display unit 6.

The output of the D/A converter 42 is supplied to the NTSC encoder 44. The component video signal comprising a luminance signal Y and color difference signals $C_R$ and $C_B$ is converted into the composite video signal of the NTSC system by the NTSC encoder 44. The composite video signal is outputted from the external output terminal 45.

The audio data read out from the MD recording and reproducing unit 39 is sent to the audio signal compression encoder and decoder 48. The decompressing process of the ATRAC2 is performed by the audio signal compression encoder and decoder 48.

An output of the audio signal compression encoder and decoder 48 is supplied to a D/A converter 49. The digital audio signal is converted into the analog audio signal by the D/A converter 49. An output of the D/A converter 49 is supplied to the speaker 8 via an amplifier 50 and is transmitted to a headphones terminal 51.

An input is supplied from the operation unit 7 to the system controller 37. As keys which are arranged in the operation unit 7, there are basic keys to operate the video camera and various keys for a reproducing operation to reproduce the recorded contents are included.

The external input/output terminal (I/F terminal) 12 to connect external data equipment is provided. The external I/O terminal 12 is connected to a bus from the system controller 37 through an I/F (interface) 52. The external data equipment can be connected through the external I/O terminal 12.

For example, IEEE1394 or the like is used as an interface 52. For instance, when an external digital video equipment and the video camera are connected through the external I/O terminal 12, images photographed by the video camera can be recorded into the external digital video equipment or the video data or the like reproduced by the external digital video equipment can be fetched.

A construction of the MD recording and reproducing unit 39 will now be described. The MD recording and reproducing unit 39 records and reproduces data to/from an MD in accordance with the MD-DATA2 format.

Figure 6:
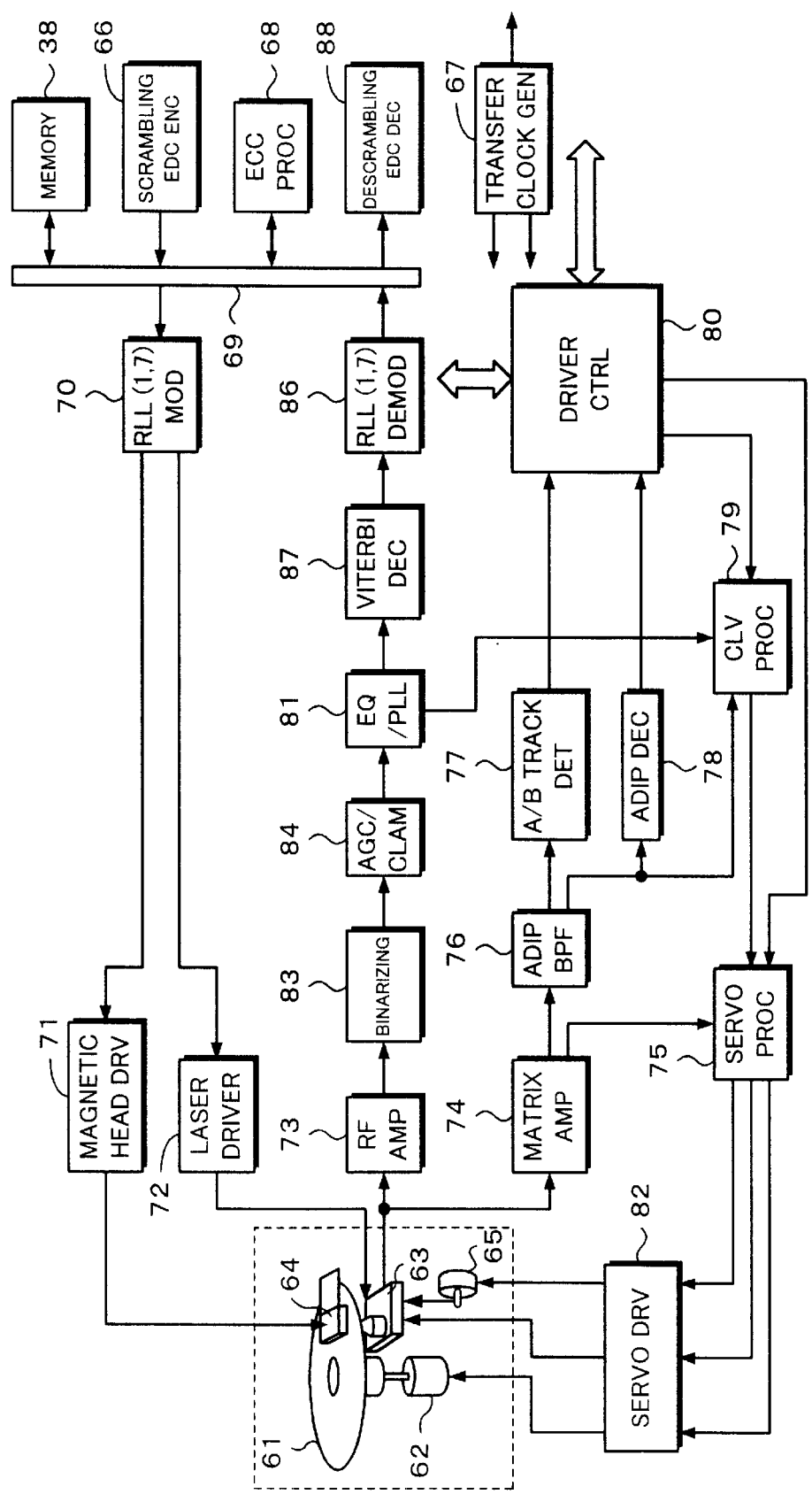
FIG. 6 is a block diagram showing a construction of an MD recording and reproducing unit in the video camera according to the embodiment of the invention.

FIG. 6 shows the construction of the MD recording and reproducing unit 39. In FIG. 6, reference numeral 61 denotes a disc as an MD of the MD-DATA2 format. The disc 61 is rotated by a spindle motor 62. An optical head 63 and a magnetic head 64 are provided for the disc 61. The optical head 63 and magnetic head 64 can be moved in the radial direction of the disc by a thread motor 65.

In the disc of the MD-DATA2 format, a track pitch is set to 0.95 μm and double spiral tracks are formed. The RLL (Run Length Limited) (1,7) system is used as a modulating system.

Upon recording, the recording data is supplied to a scrambling and EDC (Error Detection Code) encoding circuit 66. The recording data is inputted synchronously with a transfer clock generated from a transfer clock generating circuit 67.

The data inputted to the scrambling and EDC encoding circuit 66 is once written into the buffer memory 38 via the data bus 69 and is subjected to a data scrambling process and an EDC encoding process, namely, an additional process of the error detection code by a predetermined system. After completion of these processes, an error correction code according to the RS-PC method is added to the processed data by, for example, an ECC (Error Correction Code) processing circuit 68.

The data is read out from the buffer memory 38 and is supplied to an RLL(1,7) modulating circuit 70 through the data bus 69. An RLL(1,7) modulating process is performed to the inputted user recording data by the RLL(1,7) modulating circuit 70. An output of the RLL(1,7) modulating circuit 70 is supplied to the magnetic head 64 through a magnetic head driving circuit 71.

The recording system for the disc in the MD-DATA2 format is what is called a laser strobe magnetic field modulating method. The laser strobe magnetic field modulating method is a recording method such that a magnetic field modulated according to the recording data is applied to the disc recording surface and a laser beam to be irradiated onto the disc is emitted as pulses synchronously with the recording data.

The magnetic field modulated by the recording data is applied to the disc 61 by the magnetic head 64. In this instance, a clock synchronized with the recording data is supplied from the RLL(1,7) modulating circuit 70 to a laser driver 72. The clock is supplied to the optical head 63. Thus, the laser diode of the optical head 63 is driven synchronously with the recording data that is generated as a magnetic field by the magnetic head 64. Thus, the data is recorded to the disc 61.

Upon reproduction, the data on the disc 61 is read out by the optical head 63. A photocurrent which is information detected by the data reading operation and is obtained by detecting the laser reflection light by a photodetector is supplied to an RF (Radio Frequency) amplifier 73.

The photocurrent as detection information read out from the disc 61 by the optical head 63 is supplied to a matrix amplifier 74. By performing a desired arithmetic operating process to the inputted detection information by the matrix amplifier 74, a tracking error signal TE, a focusing error signal FE, and groove information (GFM) as absolute address information recorded as a wobbled groove WG on the disc 61, and the like are extracted. The tracking error signal TE and focusing error signal FE are supplied to a servo processor 75. The groove information GFM is supplied to an ADIP band pass filter 76.

The groove information GFM transmitted through the ADIP band pass filter 76 is supplied to an A track or B track detecting circuit 77, an ADIP decoder 78, and a CLV processor 79.

Which one of the tracks Tr·A and Tr·B is at present being traced is discriminated by the A track or B track detecting circuit 77 from the inputted groove information GFM. Track discrimination information as a result of the discrimination is supplied to a driver controller 80.

The ADIP (Address In Pregroove) decoder 78 decodes the groove information GFM and extracts an ADIP signal as absolute address information on the disc. The ADIP signal is supplied to the driver controller 80. A desired control process is executed by the driver controller 80 on the basis of the track discrimination information and the ADIP signal.

A clock CLK from an equalizer and PLL (Phase Locked Loop) circuit 81 and the groove information GFM are inputted to the CLV processor 79. For example, a spindle error signal SPE for CLV servo control is formed by the CLV processor 79 on the basis of an error signal that is obtained by integrating a phase error between the groove information GFM and clock CLK. The spindle error signal SPE is supplied to the servo processor 75. A desired operation to be executed by the CLV processor 79 is controlled by the driver controller 80.

The servo processor 75 generates various servo control signals such as tracking control signal, focusing control signal, thread control signal, spindle control signal, and the like on the basis of the tracking error signal TE, focusing error signal FE, and spindle error signal SPE derived by arithmetic operations from the reproduction signal from the disc and a track jump command, an access command, and the like from the driver controller 80.

A servo driver 82 generates desired servo driving signals on the basis of the servo control signal supplied from the servo processor 75. As servo driving signals, there are two kinds of biaxial driving signals in the focusing direction and the tracking direction to drive a biaxial mechanism, a thread motor driving signal to drive a threading mechanism, and a spindle motor driving signal to drive the spindle motor 62.

An output of the RF amplifier 73 is supplied to a binarizing circuit 83. A reproduction signal is binarized by the binarizing circuit 83. An output of the binarizing circuit 83 is supplied to an AGC & clamping circuit 84. A gain adjustment, a clamping process, and the like are performed by the AGC & clamping circuit 84. An output of the AGC & clamping circuit 84 is inputted to the equalizer & PLL circuit 81.

An equalizing process of a binary RF signal is performed by the equalizer & PLL circuit 81. By inputting the binary RF signal after the equalizing process to the PLL circuit, the clock CLK synchronized with the binary RF signal is extracted. The clock CLK from the equalizer & PLL circuit 81 is supplied to the CLV processor 79 and is used as a clock for processes in a desired signal processing circuit system as well as, for example, an RLL(1,7) demodulating circuit 86.

An output of the equalizer & PLL circuit 81 is supplied to a Viterbi decoder 87. A Viterbi decoding process is performed by the Viterbi decoder 87. An output of the Viterbi decoder 87 is supplied to an RLL(1,7) demodulating circuit 86. A data demodulating process is performed by the RLL (1,7) demodulating circuit 86 and a data stream is obtained.

The data stream obtained by the demodulating process in the RLL(1,7) demodulating circuit 86 is once written into the buffer memory 38 via the data bus 69 and is developed in the buffer memory 38. A write clock based on a transfer rate of the reproduction data from the disc 61 is generated from the transfer clock generating circuit 67. A read clock based on a transfer rate that is required in the image compression encoder and decoder 36 and the audio signal compression encoder and decoder 48 shown in FIG. 5 is generated. For the data stream developed in the buffer memory 38, first, an error correcting process is performed by the ECC processing circuit 68 on an error correction block unit basis in accordance with the RS-PC system. Further, a descrambling process and an EDC decoding process, namely, an error detecting process are performed by a descrambling & EDC decoding circuit 88. The data reproduced as mentioned above is transferred to the outside at a transfer rate according to the read clock generated by the transfer clock generating circuit 67.

As mentioned above, in the digital video camera to which the invention is applied, the data read out from the disc 61 is accumulated into the buffer memory 38 and, after that, it is transferred to the outside. The transfer rate of the data which is read out from the disc 61 is higher than the transfer rate that is required by the image compression encoder and decoder 36 and audio signal compression encoder and decoder 48, so that the data of a certain amount, for example, the data of ten seconds is always stored in the buffer memory 38. As mentioned above, since the data of a certain amount is always stored in the buffer memory 38, even if a disturbance of a certain degree such as shock, vibration, or the like occurs, the interruption of the reproduction can be prevented.

However, even if the apparatus has such a buffer memory 38, if a disturbance is large and when an abnormal rotation of the disc, an out-of focus, a deviation of the tracking position, or the like occurs, the data in the buffer memory is exhausted. As mentioned above, when the data in the buffer memory 38 is exhausted, the reproduction is temporarily interrupted.

In the digital video camera to which the invention is applied, the data amount in the buffer memory 38 is monitored by the system controller 37 shown in FIG. 5. When the data amount in the buffer memory 38 is less than a predetermined value, an operating speed of the image compression encoder and decoder 36 is reduced. When the operating speed is reduced, the transfer rate of the data that is required in the image compression encoder & decoder 36 decreases, so that a read clock of the buffer memory 38 decreases. Thus, a situation such that the data is exhausted and the reproduction is temporarily interrupted can be prevented. Since the data which is decoded by the image compression encoder and decoder 36 is the moving picture data, even if the operating speed is reduced, a slow reproduction is performed. However, since continuity of the image is maintained, the reproduced image is more natural than that in the case where the reproduction is interrupted.

Figure 7:
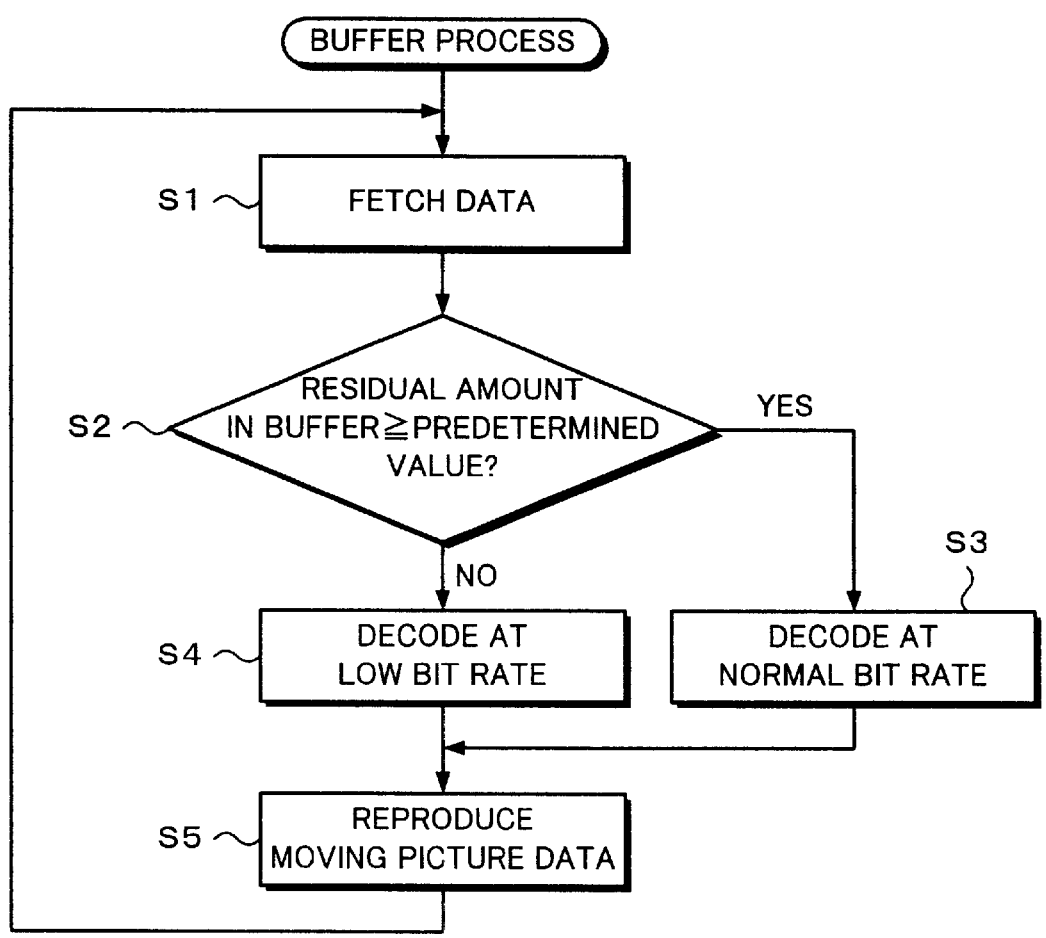
FIG. 7 is a flowchart for use in explanation of the operation of a buffer memory in the video camera according to the embodiment of the invention.

FIG. 7 is a flowchart showing processes when such a disturbance occurs. In FIG. 7, the data from the disc is stored into the buffer memory 38 in step S1. In step S2, whether a residual amount of the buffer memory 38 is equal to or larger than a predetermined value or not is discriminated by the system controller 37. When the residual amount of the buffer memory 38 is equal to or larger than the predetermined value, the decoding process is performed at an ordinary operating speed by the image compression encoder and decoder 36 in step S3. When the residual amount of the buffer memory 38 is less than the predetermined value, the operating speed of the image compression encoder & decoder 36 is reduced by the system controller 37 and the decoding process is executed in step S4. The moving picture data decoded is reproduced in step S5. The processing routine is returned to step S1.

As mentioned above, by reducing the operating speed of the image compression encoder & decoder 36, the reading speed for the buffer memory 38 becomes slow and the time that is required until the data stored in the buffer memory 38 is exhausted becomes long. That is, for instance, even if the data which is stored in the buffer memory 38 is data as much as ten seconds in the normal reproducing mode, by reducing the operating speed of the image compression encoder & decoder 36, even if there is a disturbance of a longer time, for instance, 30 seconds, the data in the buffer memory 38 does not become empty.

When an out-of focusing state occurs due to the disturbance, a focusing search is tried and the focusing control is again performed.

When an abnormal rotation of the disc occurs due to the disturbance, the pull-in of the CLV servo is retried and the CLV servo is performed.

When an out-of tracking state occurs due to the disturbance, the absolute address information of the present position on the disc is read out, a difference between the read-out absolute address information and the stored absolute address information of the position on the disc before the out-of tracking state occurs is calculated, the track jump is performed, the address is returned to the absolute address before the out-of tracking state occurs, and the tracking servo is retrieved.

Only the reading operation is executed until the operating mode is returned to the foregoing normal reproducing state and the data is accumulated, and the data amount of the buffer memory 38 after the disturbance occurred gradually decreases.

Even if the time that is required until the above various servo controls are recovered is long, by reducing the data reading speed, the time which is required until the data in the buffer memory 38 becomes empty can be extended.

If the data of the amount in the buffer memory 38 is accumulated up to a predetermined value or more, by returning the bit rate of the image compression encoder & decoder 36 to the original rate, the moving picture reproduction can be again performed at a normal speed. As mentioned above, according to the present invention, by performing the slow reproduction, the time that is required until the operating mode is recovered to the moving picture reproduction at the normal speed can have a certain extent.

The present invention is not limited to the foregoing embodiments but many modifications and variations are possible within the spirit and scope of the appended claims of the invention.

What is claimed is:

1. A reproducing apparatus comprising:
   data reproducing means for reproducing moving picture data from a recording medium on which the moving picture data has been recorded;
   data storage means for storing said reproduced moving picture data which is transferred from the data reproducing means at a predetermined transfer rate;
   data processing means for processing said moving picture data read out from said data storage means at a variable processing speed; and
   control means for monitoring an amount of stored moving picture data in said data storage means and for reducing the variable processing rate of the data processing means to maintain a continuous output from the data storage means, when the amount of stored moving picture data in said data storage means is less than a predetermined value.

2. An apparatus according to claim 1, wherein said data processing means reads out said moving picture data stored in said data storage means at a transfer rate lower than said predetermined transfer rate.

3. An apparatus according to claim 1, wherein when the data amount in said data storage means is equal to or larger than said predetermined value, the processing speed of said data processing means is set to a normal speed.

4. An apparatus according to claim 1, further comprising image display means for displaying the moving picture data from said data processing means, and
   wherein when the data amount in said data storage means is less than said predetermined value, the moving picture data in said image display means is displayed at a low speed.

5. An apparatus according to claim 4, wherein when the data amount in said data storage means is equal to or larger than said predetermined value, the moving picture data in said image display means is displayed at a normal speed.

6. An apparatus according to claim 1, wherein
   said data processing means further has clock generating means for generating a clock to read out the data stored in said data storage means, and
   when the data amount in said data storage means is less than said predetermined value, a speed of the clock of said clock generating means decreases.

7. An apparatus according to claim 1, wherein said recording medium is a disc-shaped recording medium.

8. An apparatus according to claim 1, wherein said recording medium is an optical disc or a magnetooptic disc.

9. An apparatus according to claim 1, wherein said recording medium is an optical disc comprising a track in which a groove whose both wall surfaces wobble at a predetermined period and a groove whose both wall surfaces are formed by planes are alternately adjacently provided.

10. A reproducing method comprising the steps of:
    reproducing moving picture data from a recording medium on which the moving picture data has been recorded;
    storing said reproduced moving picture data, which is transferred by the reproducing step, into a memory at a predetermined transfer rate;
    processing the moving picture data read from the memory at a variable processing speed; and
    monitoring an amount of stored data in said memory and reducing the variable processing rate of the data processing step to maintain a continuous output from the memory, when it is determined in said monitoring step that said amount of stored moving picture data in said memory is less than a predetermined value.

11. A method according to claim 10, wherein in said data processing step, the data stored in said memory is read out at a transfer rate lower than said predetermined transfer rate.

12. A method according to claim 10, further comprising the step of processing the data read out from said memory at a normal speed when the data amount in said memory is equal to or larger than said predetermined value.

13. A method according to claim 10, further comprising the step of displaying the moving picture data processed in said data processing step.

14. A method according to claim 13, wherein when the data amount in said memory is equal to or larger than said predetermined value, said moving picture data is displayed at a normal speed.

15. A method according to claim 10, wherein said recording medium is a disc-shaped recording medium.

16. A method according to claim 10, wherein said recording medium is an optical disc or a magnetooptic disc.

17. A method according to claim 10, wherein said recording medium is an optical disc comprising a track in which a groove whose both wall surfaces wobble at a predetermined period and a groove whose both wall surfaces are formed by planes are alternately adjacently provided.

18. A reproducing apparatus comprising:
    a data reproducing unit configured to reproduce moving picture data from a recording medium on which the moving picture data has been recorded;
    a data storage memory configured to store said reproduced moving picture data which is transferred from the data reproducing unit at a predetermined transfer rate;
    a data processor configured to process said moving picture data read out from said data storage memory at a variable processing speed; and a controller configured to monitor an amount of stored moving picture data in said data storage memory and to reduce the variable processing rate of the data processor to maintain a continuous output from the data storage memory, when the amount of stored moving picture data in said data storage memory is less than a predetermined value.

19. An apparatus according to claim 18, wherein said data processor reads out said moving picture data stored in said data storage memory at a transfer rate lower than said predetermined transfer rate.

20. An apparatus according to claim 18, wherein when the data amount in said data storage memory is equal to or larger than said predetermined value, the processing speed of said data processor is set to a normal speed.

21. An apparatus according to claim 18, further comprising an image display configured to display the moving picture data from said data processor, and wherein when the data amount in said data storage memory is less than said predetermined value, the moving picture data in said image display is displayed at a low speed.

22. An apparatus according to claim 21, wherein when the data amount in said data storage memory is equal to or larger than said predetermined value, the moving picture data in said image display is displayed at a normal speed.

23. An apparatus according to claim 18, wherein said data processor further has a clock generator configured to generate a clock to read out the data stored in said data storage memory, and when the data amount in said data storage memory is less than said predetermined value, a speed of the clock of said clock generator decreases.

24. An apparatus according to claim 18, wherein said recording medium is a disc-shaped recording medium.

25. An apparatus according to claim 18, wherein said recording medium is an optical disc or a magnetooptic disc.

26. An apparatus according to claim 18, wherein said recording medium is an optical disc comprising a track in which a groove whose both wall surfaces wobble at a predetermined period and a groove whose both wall surfaces are formed by planes are alternately adjacently provided.

* * * * *

UNITED STATES PATENT AND TRADEMARK OFFICE
CERTIFICATE OF CORRECTION

PATENT NO. : 6,564,004 B1 Page 1 of 1
DATED : May 13, 2003
INVENTOR(S) : Toru Kadono It is certified that error appears in the above-identified patent and that said Letters Patent is hereby corrected as shown below:

Column 6,
Line 61, please change "CR" to -- $C_R$ --;
Line 62, please change "CB" to -- $C_B$ --.

Signed and Sealed this

Twenty-second Day of June, 2004

JON W. DUDAS
*Acting Director of the United States Patent and Trademark Office*